United States Patent
Garcia et al.

(10) Patent No.: US 11,639,302 B2
(45) Date of Patent: May 2, 2023

(54) PROCESS FOR REDUCING THE CONCENTRATION OF ARSENIC IN AN AQUEOUS SOLUTION COMPRISING A FLUOROACID

(71) Applicant: Mexichem Fluor S.A. de C.V., San Luis Potosi (MX)

(72) Inventors: Juan Alberto Juarez Garcia, San Luis Potosi (MX); Iris Samantha Duran Castillo, San Luis Potosi (MX); Nilo Martinez Robles, San Luis Potosi (MX)

(73) Assignee: Mexichem Fluor S.A. de C.V., San Luis Potosi (MX)

( * ) Notice: Subject to any disclaimer, the term of this patent is extended or adjusted under 35 U.S.C. 154(b) by 557 days.

(21) Appl. No.: 16/348,242

(22) PCT Filed: Nov. 9, 2017

(86) PCT No.: PCT/GB2017/053380
§ 371 (c)(1),
(2) Date: May 8, 2019

(87) PCT Pub. No.: WO2018/087552
PCT Pub. Date: May 17, 2018

(65) Prior Publication Data
US 2019/0270656 A1    Sep. 5, 2019

(30) Foreign Application Priority Data
Nov. 10, 2016 (GB) ...................... 1618985

(51) Int. Cl.
*C02F 1/52* (2006.01)
*C01B 7/19* (2006.01)
(Continued)

(52) U.S. Cl.
CPC ............ *C02F 1/5245* (2013.01); *C01B 7/191* (2013.01); *C01B 9/08* (2013.01); *C01B 33/103* (2013.01);
(Continued)

(58) Field of Classification Search
None
See application file for complete search history.

(56) References Cited

U.S. PATENT DOCUMENTS 3,166,379 A    1/1965 Bradley et al.
4,062,930 A *  12/1977 Zawadzki ............... C01B 7/191
                                                  423/483
(Continued)

FOREIGN PATENT DOCUMENTS

CN    101033067 A    9/2007
CN    101468264 A    7/2009
(Continued)

OTHER PUBLICATIONS

Shankar et al. (The Scientific World Journal, 2014, pp. 1-19). (Year: 2014).*
(Continued)

*Primary Examiner* — Clare M Perrin

(57) ABSTRACT

A process for reducing the concentration of one or more arsenic-containing compounds in an aqueous solution comprising at least one fluoroacid, which process comprises: (i) contacting the aqueous solution with an oxidising agent to produce one or more Asv-containing compounds; and (ii) removal of precipitated arsenic-containing compounds; wherein the process comprises a step (iii) the addition of an aqueous alkali solution or slurry, which may take place after step (i) and before step (ii) or after step (ii).

24 Claims, 2 Drawing Sheets

(51) Int. Cl.
    *C01B 9/08* (2006.01)
    *C01B 33/10* (2006.01)
    *C01G 28/02* (2006.01)
    *C02F 1/72* (2006.01)
    *C02F 1/76* (2006.01)
    *C02F 1/66* (2006.01)
    *C02F 101/10* (2006.01)
    *C02F 103/34* (2006.01)
    *C01G 28/00* (2006.01)

(52) U.S. Cl.
    CPC .............. *C01G 28/02* (2013.01); *C02F 1/52* (2013.01); *C02F 1/66* (2013.01); *C02F 1/72* (2013.01); *C02F 1/722* (2013.01); *C02F 1/76* (2013.01); *C01G 28/007* (2013.01); *C02F 2001/5218* (2013.01); *C02F 2101/103* (2013.01); *C02F 2103/34* (2013.01)

(56) References Cited

U.S. PATENT DOCUMENTS

| | | | |
|---|---|---|---|
| 5,358,643 A | | 10/1994 | McClintock |
| 5,378,366 A | * | 1/1995 | Yen .................. C02F 1/5236 210/667 |
| 2002/0003116 A1 | | 1/2002 | Golden |
| 2004/0144729 A1 | | 7/2004 | Witham et al. |

FOREIGN PATENT DOCUMENTS

| | | |
|---|---|---|
| CN | 103043812 A | 4/2013 |
| CN | 103553197 A | 2/2014 |
| DE | 3632138 | 3/1988 |
| EP | 1028087 A1 | 8/2000 |
| FR | 2627481 | 8/1989 |
| JP | H03-165891 A | 7/1991 |
| JP | H06-247708 A | 9/1994 |
| JP | 2013/095629 A | 5/2013 |
| WO | 9406716 | 3/1994 |
| WO | 1996/037438 A1 | 11/1996 |
| WO | 2012/120197 A1 | 9/2012 |

OTHER PUBLICATIONS

Mullenix et al. (International Journal of Occupational and Environmental Health, 2014, 20, 157-166). (Year: 2014).*
Chouhan et al. (Indian Journal of Experimental Biology, 2010, 48, 666-678). (Year: 2010).*
ScienceDirect: Aluminium Trifluoride—an overview: https://www.sciencedirect.com/topics/chemistry/aluminium-trifluoride; portion relied upon is Meshri, published in 2000, bottom of p. 3). (Year: 2000).*
Dahlke et al. (Procedia Engineering, 2016, 138, 231-239). (Year: 2016).*
PCT/GB2017/053380 International Search Report and Written Opinion of the International Searching Authority dated Jan. 26, 2018 (12 pages).

* cited by examiner

PROCESS FOR REDUCING THE CONCENTRATION OF ARSENIC IN AN AQUEOUS SOLUTION COMPRISING A FLUOROACID

The present invention relates to a process for reducing the concentration of arsenic-containing compounds in an aqueous solution.

Industrially, hydrogen fluoride (HF) is produced from the mineral fluorspar ($CaF_2$) by treatment with sulfuric acid ($H_2SO_4$). Silica-containing minerals in the fluorspar react with the HF to form silicon tetrafluoride ($SiF_4$):

$$4HF + SiO_2 \rightarrow SiF_4 + 2H_2O$$

The $SiF_4$ can further react with HF in the presence of water to form fluorosilicic acid ($H_2SiF_6$, FSA, hexafluorosilicic acid):

$$SiF_4 + 2HF(aq) \rightarrow H_2SiF_6$$

This results in an overall reaction of:

$$6HF + SiO_2 \rightarrow H_2SiF_6 + 2H_2O$$

Approximately 50 kg of $H_2SiF_6$ is produced per tonne of HF. Typically, this is recovered from the HF manufacturing process as a 3 to 40 wt % aqueous solution of fluorosilicic acid.

Neutralisation of the solution of fluorosilicic acid with a base produces the corresponding alkali metal fluorosilicate salt, e.g.:

$$H_2SiF_6 + Ca(OH)_2 \rightarrow Ca_2SiF_6 + 2H_2O$$

However, fluorspars often contain chemically bound arsenic that can be present in many forms, including arsenic oxide. For example, fluorspar from the Las Cuevas mine near San Luis Potosi in Mexico typically contains 300 ppm arsenic. This arsenic in the fluorspar reacts with the HF produced during HF manufacture to form arsenic trifluoride:

$$6HF + As_2O_3 \rightarrow 2AsF_3 + 3H_2O$$

The $AsF_3$ enters the aqueous solution of fluorosilicic acid.

The identification of arsenic as a potent carcinogen in 1993 lead the World Health Organisation (WHO) to revise the guideline for the maximum arsenic content of drinking water from 50 μg $L^{-1}$ to 10 μg $L^{-1}$ (WHO, Guidelines for Drinking Water Quality, 2 edition, 1993). Arsenic in drinking water is threatening the health of people in more than 70 countries around the globe and it is estimated that 170 million people are being unknowingly exposed to unsafe levels of arsenic in their drinking water. The predominant oxidation states of arsenic in water are $As^V$ (as arsenate) and $As^{III}$ (as arsenite).

In the United States, the Environmental Protection Agency (EPA) has authority over safe community drinking water, as specified in the Safe Drinking Water Act. For arsenic, the EPA has set a 10 ppb limit on the concentration in additives to water supplies (see http://www.cdc.gov/fluoridation/factsheets/enqineering/wfadditives.htm).

Consequently, if the fluorosilicic acid is to be used in water fluoridation or if a waste stream is to be returned to rivers, etc., it is necessary to reduce the arsenic concentration, ideally to less than 10 ppb.

The listing or discussion of an apparently prior-published document in this specification should not necessarily be taken as an acknowledgement that the document is part of the state of the art or common general knowledge.

There is therefore a need for a process that effectively removes arsenic-containing compounds from aqueous solutions. In particular, there is a need for such a process in the context of fluorspar treatment and hydrogen fluoride production.

The present invention provides a process for reducing the concentration of one or more arsenic-containing compounds in an aqueous solution comprising:
(i) contacting the aqueous solution with an oxidising agent to produce one or more $As^V$-containing compounds; and
(ii) removal of precipitated arsenic-containing compounds.

For the avoidance of doubt and unless otherwise stated, the 'aqueous solution' as described herein is the aqueous solution containing one or more arsenic containing compounds to be treated by the process of the invention. Arsenic-containing compounds are any covalent, ionic, solvated or unsolvated compounds containing one or more atoms of arsenic in any oxidation state.

Without wishing to be bound by theory, it is believed that the production of arsenic-containing compounds in their $As^V$ state precipitate out as a salt upon contact with the ions (such as iron, manganese, lead and chromium) naturally present in the aqueous solution.

An example of this process can be represented by the following formula:

$$H_3AsO_3 + NaClO + [M] \rightarrow [M](AsO_4) + NaCl + XH2O$$

[M] represents metallic ions present in solution and X represents the moles of water and which is dependent on the metallic ion in the solution. Examples of possible [M] ($AsO_4$) compounds formed as part of the process are $FeAsO_4$, $Fe_3(AsO_4)_3$, $PbAsO_4$ and $CrAsO_4$.

The aqueous solution may comprise fluoroacids, such as fluorosilicic acid or hydrogen fluoride (HF). Advantageously, the fluoroacid is present in an amount of from about 1 to about 50% by weight based on the total weight of the aqueous solution, such as from about 20 to about 40% by weight, or even about 35% by weight.

The arsenic-containing compounds in the aqueous solution typically comprise arsenic in the +3 oxidation state (i.e. $As^{III}$). The one or more arsenic-containing compounds may comprise $AsF_3$ or the hydrolysed form of $AsF_3$, i.e. $H_3AsO_3$.

Any suitable oxidising agent may be used in step (i). Suitable oxidising agents include, but are not limited to, chlorine ($Cl_2$), hypochlorite salts ($M^+ClO^-$), hypochlorous acid (HClO), hydrogen peroxide ($H_2O_2$) and permanganate salts ($M^+MnO_4^-$) and mixtures thereof, wherein M is any suitable metal ion that can form the respective salt. Preferably, the oxidising agent is selected from chlorine, hypochlorous acid (HClO) and permanganate salts ($M^+MnO_4^-$). Advantageously, the chlorine may be added as a gas and dissolved in situ or dissolved in water prior to the addition.

It will be understood by the skilled person that, prior to contacting with the aqueous solution, the oxidising agent may be present in a solution or in a pure (solid or liquid) form.

Preferably, the oxidising agent is used in a stoichiometric excess relative to the quantity of oxidisable arsenic-containing compounds. Advantageously, stoichiometric excess is three or more times the quantity of oxidisable arsenic-containing compounds, for example a stoichiometric excess of about 4 to about 50 or about 60 times the quantity of oxidisable arsenic-containing compounds or about 5 to about 40 times the quantity of oxidisable arsenic-containing compounds, such as about 6 or about 8 or about 10 or about 20 or about 30 times to about 40, about 50 or about 60 times.

In an embodiment, step (i) consists of the addition of the oxidising agent as the only reagent. For example, optionally step (i) does not comprise the addition of smelter slag or a similar material to the aqueous solution. Smelter slag is slag produced in any pyrometallurgical smelting processes. The major components of smelter slag include but are not limited to iron oxides and aluminium oxides. It is not typically necessary to add any such material during the process of the invention. Thus, in one aspect the present invention provides a process that not comprise additionally contacting the aqueous solution with one or more iron-containing compounds.

In other words, in one aspect, the process of the invention does not comprise a step of deliberately adding ions that may cause precipitation such as transition metal ions such as iron ions.

Step (i) of the process is carried out at an acidic pH, preferably at a pH of less than 3, such as less than 2, or even less than 0.5.

Step (i) is advantageously carried out at a temperature of from about 0 to about 35° C., such as from about 10 to about 30° C. or even from about 20 to about 28° C., such as about 25° C.

Step (i) may be carried out for a time period of from about 1 to about 30 minutes, preferably from about 1 to about 10 minutes, such as from about 2 to about 5 minutes.

Methods suitable for the removal of the precipitated arsenic-containing compounds in step (ii) include, but are not limited to, gravity-settling (also known as sedimentation), filtration, anion-exchange resin and combinations thereof.

For example, the precipitated arsenic-containing compounds can be removed from aqueous fluorosilicic acid in a sedimentation tank with an outlet at the bottom for purging solids, after the precipitated particles have sunk to the floor of the tank, and an outlet at the top where the fluorosilicic acid optionally goes to filtration.

As noted above, the insoluble arsenic (V) can also be removed using an ion exchange resin. Arsenic compounds with +5 valence state have a negative overall charge because of the formation of compounds such as $HAsO_4^{2-}$ and $H_2AsO_4^-$. Therefore, to remove arsenic (V), the resin must be of the anion exchange type, for example Purolite PFA300.

The resins used can be regenerated with NaOH or NaCl. Anion exchange resins may achieve a 99% removal of arsenic from the aqueous solution to be treated (e.g. from aqueous fluorosilicic acid).

The process of the invention may comprise an additional step (iii) that may be carried out after step (i) and before step (ii) or after step (ii).

Step (iii) is typically carried out at ambinent temperature, for example at a temperature of from about 0 to about 35° C., such as from about 15 to about 30° C. or about 25° C., or even from about 20 to about 28° C.

Additional liquid can be obtained from a washing step after step (ii), e.g. the filtrate from the washing of a filter cake or other filter media (if the removal is carried out by filtration) or from the regenerated resins. This additional liquid or the treated aqueous solution may still contain a high concentration of arsenic which it may be desirable to remove and/or a high degree of acidity which it may be desirable to neutralize.

In view of this, step (ii) is preferably followed by the addition of an aqueous basic solution or slurry of an alkali or alkaline earth metal (step (iii)) to the treated aqueous solution or the additional liquid. The aqueous basic solution or slurry of an alkali or alkaline earth metal is also referred to herein as the alkali solution or slurry.

Advantageously, the base is calcium hydroxide $(Ca(OH)_2$, lime) or any compound that may ultimately form $Ca^{2+}$ ions, such as calcium oxide (CaO).

A solution or slurry of lime may neutralize the acidic streams and simultaneously precipitate at least part of the arsenic as calcium arsenate $(Ca_2AsO_4)$. The solubility of calcium arsenate in water is only 0.013 g/100 mL at 25° C. (https://en.wikipedia.org/wiki/Calcium arsenate), thereby allowing effective removal of the arsenic.

The alkali slurry or solution, such as a lime slurry or solution, may be any desired strength, but $Ca(OH)_2$ is preferably present in an amount of from about 10 to about 30% by weight, such as from about 15 to about 20% by weight of the total amount of solution or slurry.

When step (ii) is followed by the addition of an aqueous solution or slurry of an alkali or alkaline earth metal, the process preferably comprises a subsequent step of removal of the resulting precipitate, step (iv). The removal step (iv) may be conducted in any suitable manner, for example one or more methods described in relation to step (ii).

Alternatively, step (ii) may be preceded by the addition of an aqueous basic solution or slurry of an alkali or alkaline earth metal (step (iii)).

The process may further comprise dilution of the aqueous solution to be treated prior to the addition of the alkali solution or slurry. This is particularly preferable if step (iii) is to be carried out prior to step (ii). For example, if the concentration of $H_2SiF_6$ in the aqueous solution is above 10 wt %, the solution is preferably diluted before treatment with an alkali solution or slurry, such as lime solution or slurry. This has the advantage of reducing the formation of calcium silicates, which can make separation and handling difficult.

The liquid remaining after the addition of lime can be returned to step (i) or (ii) if desired or may be sent for disposal.

It is to be understood that the process of the invention may further comprise subsequently recycling all or part of the treated aqueous solution and repeating one or more steps of the described process. For example, the filtrate obtained in step (ii) or, if used, step (iv) may be recycled to step (i).

Optionally, any solids (which are typically produced in the form of a wet sludge) generated in step (iii) can be dried by natural evaporation prior to disposal.

The process of the invention can typically remove from about 50 to about 100% by weight of the arsenic-containing compounds from the aqueous solution, preferably from about 60 to about 100% by weight, such as from 70 to about 100% by weight.

The process of the present invention preferably results in a treated aqueous solution that contains 5 ppm or less of arsenic-containing compounds, such as 1 ppm, 0.1 ppm or even 0.01 ppm (i.e. 10 ppb) of less. Preferably, the process of the invention results in water that is suitable for drinking or returning to rivers or lakes.

The present invention also provides a process for the production of fluorosilicic acid comprising a process as described herein. Preferably, the production of fluorosilicic acid occurs during or after the treatment of acid grade fluorspar with sulphuric acid.

The present invention also provides a process for the purification of fluorosilicic acid comprising a process as described herein. Advantageously, the process may be combined with a process involving the production of the fluorosilicic acid The present invention also provides a process for the production of HF comprising a process as described herein. The process may comprise the drying of wet fluorspar ($CaF_2$), prior to the addition of sulphuric acid and, optionally, oleum, to produce HF.

The present invention also provides a process for the production of aluminium trifluoride ($AlF_3$) comprising a process as described herein. Such a process may produce $AlF_3$ by reacting dry aluminium hydroxide with gaseous HF (i.e. $Al(OH)_3 + 3HF \rightarrow AlF_3 + 3H_2O$). The HF may be produced by a process as described above. Advantageously, the production of $AlF_3$ is carried out in a two-stage fluid bed reactor. Solids may be recovered from the reactor, while the off-gas is condensed and washed with water prior to emission to the atmosphere.

Figure 1:
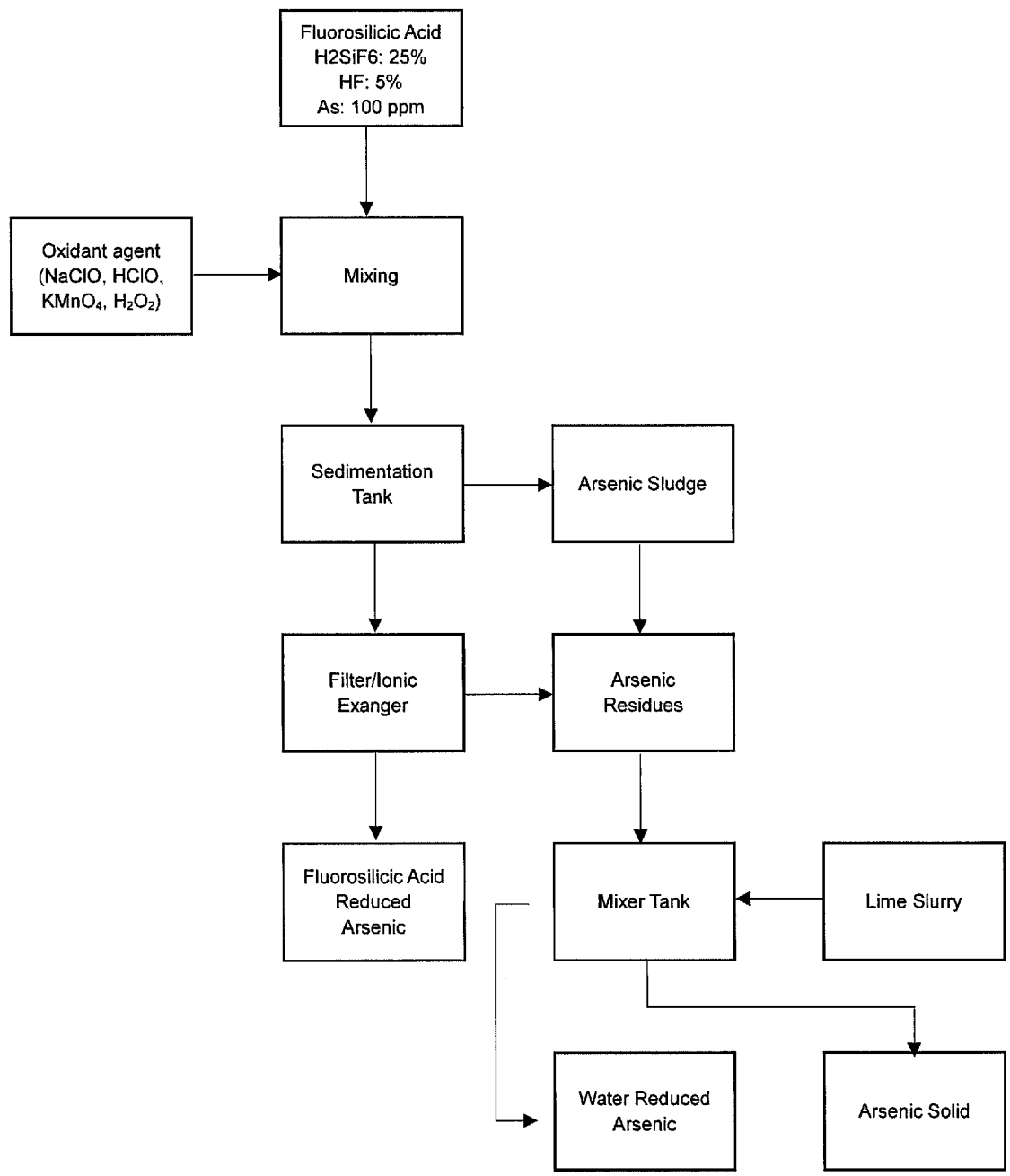
FIG. 1 shows a process of the invention where step (iii) is carried out after step (ii).

As an example of the process of the invention, step (i) may be carried out in a static mixer before the solution is moved to a sedimentation tank. The arsenic-containing sludge is then removed and the treated solution is contacted with an ionic exchanger, i.e. an anion exchange resin as part of step (ii). The arsenic-containing residues and sludge produced in steps (i) and (ii) can then be transferred to a further mixing tank where an alkali slurry is added (step (iii)), before the arsenic containing solids are separated from the solution. This is represented by FIG. 1.

Figure 2:
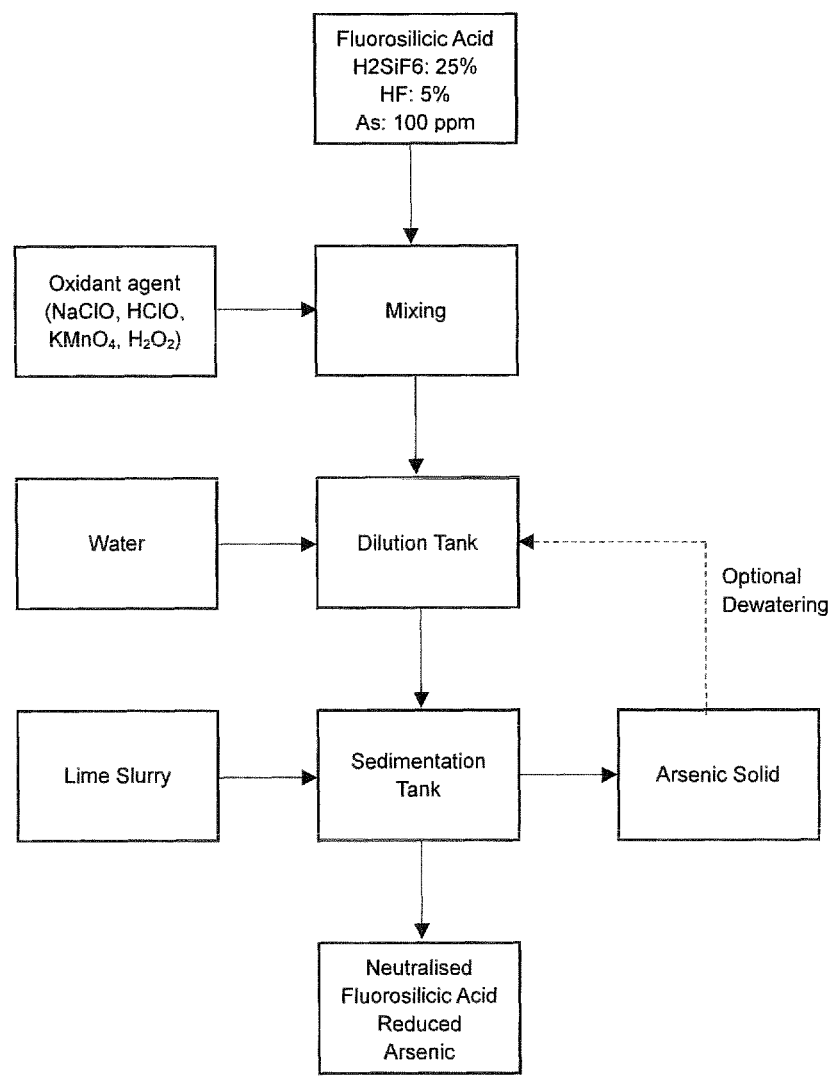
FIG. 2 shows a process of the invention where step (iii) is carried out before step (ii).

In an alternative, step (i) may be carried out in a static mixer before the solution is moved to a dilution tank to reduce the concentration of fluorosilicic acid to below 10% by weight. The aqueous solution is then transferred to a sedimentation tank and contacted with an alkali slurry (step (iii)). The arsenic-containing solids that are generated are then separated from the solution in step (ii). This alternative set up is represented by FIG. 2.

Preferences and options for a given aspect, feature or parameter of the invention should, unless the context indicates otherwise, be regarded as having been disclosed in combination with any and all the preferences and options for all other aspects, features and parameters of the invention.

The invention will now be illustrated with reference to the following, non-limiting Examples.

EXAMPLES

All percentages are given by weight of the total composition unless otherwise specified.

Example 1

Arsenic Oxidation by 1% $KMnO_4$ Solution, Followed by Filtration and Neutralization 1. A sample of aqueous $H_2SiF_6$ was taken from an HF manufacturing plant that uses high arsenic fluorspar. The sample was analysed and found to contain 25.48% $H_2SiF_6$, 4.94% HF and 140.028 ppm arsenic 2. 100 mL samples of $H_2SiF_6$ were placed in 4 different beakers and stirred at 350 RPM 3. 10 mL of a 1% solution of $KMnO_4$ were added to each beaker and stirred for varying amounts of time as shown in Table 1.

TABLE 1

| Time (min) | $KMnO_4$ 1% (mL) | $H_2SiF_6$ (mL) | RPM |
|---|---|---|---|
| 5 | 10 | 100 | 350 |
| 10 | 10 | 100 | 350 |
| 15 | 10 | 100 | 350 |
| 20 | 10 | 100 | 350 |

4. After the allotted time the solution was filtered with Whatman filter paper and then filtered again with a filter cloth 5. From this filtrate an aliquot was taken to measure the concentration of arsenic, the results of which are provided in Table 2.

TABLE 2

| Time (min) | $KMnO_4$ 1% (mL) | $H_2SiF_6$ (mL) | RPM | As (ppm) | Removal (%) |
|---|---|---|---|---|---|
| 5 | 10 | 100 | 350 | 38.1 | 73 |
| 10 | 10 | 100 | 350 | 44.0 | 69 |
| 15 | 10 | 100 | 350 | 25.0 | 82 |
| 20 | 10 | 100 | 350 | 26.3 | 81 |

6. 50 mL of each filtrate was taken and neutralized with 15% $Ca(OH)_2$ slurry. The final pH of each solution is provided in Table 3.

TABLE 3

| Time (min) | $H_2SiF_6$ (mL) | $Ca(OH)_2$ slurry (g) | pH |
|---|---|---|---|
| 5 | 50 | 10 | 14 |
| 10 | 50 | 7.8 | 10 |
| 15 | 50 | 7.07 | 10 |
| 20 | 50 | 7.65 | 10 |

7. The neutralized solution was filtered through Whatman filter paper

8. The filtrate was analysed with the results being shown in Table 4.

TABLE 4

| Time (min) | $H_2SiF_6$ (mL) | $Ca(OH)_2$ slurry (g) | pH | As (ppm) | Removal (%) |
|---|---|---|---|---|---|
| 5 | 50 | 10 | 14 | 0.00 | 100.00% |
| 10 | 50 | 7.8 | 10 | 0.01 | 99.99% |
| 15 | 50 | 7.07 | 10 | 0.00 | 100.00% |
| 20 | 50 | 7.65 | 10 | 0.03 | 99.98% |

Example 2

Arsenic Oxidation with NaClO (12 wt %)

1. A 500 mL sample of aqueous $H_2SiF_6$ was taken from an HF manufacturing plant that uses high arsenic spar. The sample was analysed and found to contain 25% $H_2SiF_6$, 5% HF and 100 ppm arsenic 2. 10 mL and 5 mL portions of 12% aqueous NaClO were added to two 100 mL samples of the aqueous $H_2SiF_6$ 3. The mixtures were stirred at 350 rpm for 10 minutes 4. The resulting mixtures were filtered with double filtration Whatman paper 5. The arsenic concentration of the filtrates were analysed. The results are presented in Table 5.

TABLE 5

| Sample | Filtration | As (ppm) | Removal (%) |
|---|---|---|---|
| 10 mL NaClO | Double | 4.8 | 93.3 |
| 5 mL NaClO | Double | 4.2 | 94.1 |

Example 3

Arsenic Oxidation with NaClO, R=Weight Ratio of NaClO (g) to Arsenic (g)

1. A sample of aqueous $H_2SiF_6$ was taken from an HF manufacturing plant that uses high arsenic fluorspar. The sample was analysed and found to contain 25% by weight $H_2SiF_6$, 5% HF and 100 ppm arsenic
2. 1000 mL of the $H_2SiF_6$ was placed in a polypropylene container
3. 110 mL of 12% aqueous NaClO was added to the sample
4. The mixture was stirred at 450 rpm for 15 minutes
5. The sample was allowed to stand for 10 min before being filtered with two Whatman filter papers
6. 37.97 g of white solids are recovered once the filtered solids are dried
7. The arsenic concentration of the filtrate was analysed with the results set out in Table 6.

TABLE 6

| Sample | As (ppm) | Removal (%) |
|---|---|---|
| NaClO R = 172 | 4.4 | 95.6 |

8. Two aliquots of the filtrate were taken and subsequently diluted to obtain an aqueous solution at 10% and 1% by weight of $H_2SiF_6$
9. 15% $Ca(OH)_2$ slurry was added to neutralize the $H_2SiF_6$ and capture any arsenic still present in the filtrate
10. The results are presented in Table 7.

TABLE 7

| Concentration of $H_2SiF_6$ | $Ca(OH)_2$ slurry (g) | pH | As (ppm) | Removal (%) |
|---|---|---|---|---|
| 1% | 5.06 | 10.09 | 0.09 | 99.91 |
| 10% | 53.4 | 10.22 | 0.139 | 98.82 |

11. The samples were filtered again with Whatman paper and the $Ca(OH)_2$ was added to neutralise the samples
12. The results are set out in Table 8.

TABLE 8

| Concentration of $H_2SiF_6$ | $Ca(OH)_2$ slurry (g) | pH | As (ppm) | Removal (%) |
|---|---|---|---|---|
| 1% | 5.06 | 10.09 | 0.06 | 99.92 |
| 10% | 53.4 | 10.22 | 0.03 | 99.96 |

Example 4

Arsenic Removal in Process Effluents Hydrofluoric Acid

1. Two samples of 500 mL of aqueous $H_2SiF_6$ were taken from an HF manufacturing plant that uses high arsenic spar. The sample was analysed and found to contain 25% by weight $H_2SiF_6$, 5% by weight HF and 100 ppm arsenic
2. 1.1 g of 12% by weight NaClO (aq) was added to each sample
3. The samples were mixed at 700 rpm for 15 minutes
4. The solutions were filtered with Whatman filter paper
5. The arsenic content of the filtrates were analysed and the results are set out in Table 9.

TABLE 9

| Sample | 12% NaClO (g) | As (ppm) | Removal (%) |
|---|---|---|---|
| 1 | 1.1671 | 0.47 | 69 |
| 2 | 1.0503 | 0.20 | 87 |

6. Subsequently, these samples were neutralized with 15% $Ca(OH)_2$ slurry until a pH of 10 was reached. The results are set out in Table 10.

TABLE 10

| Sample | $Ca(OH)_2$ slurry (g) | pH | As (ppm) | Removal (%) |
|---|---|---|---|---|
| 1 | 2.9 | 10.46 | 0.014 | 99% |
| 2 | 3.5 | 10.74 | 0.023 | 98% |

Example 5

Arsenic Removal in Fluorosilicic Acid by Oxidation and Ion Exchange

1. A 400 mL sample of effluent was taken from an HF manufacturing plant that uses high arsenic spar. The sample was analysed and found to contain 25% $H_2SiF_6$, 5% HF and 100 ppm Arsenic
2. 20 mL of 12% aqueous NaClO was added
3. The mixture was stirred at 750 rpm and left to stand for 15 minutes
4. The solution was filtered with 250 g of a strong anion exchange resin type II (Purolite PFA 300)
5. The solution was in contact with the resin for 15 minutes before the cycle was repeated
6. The results are set out in Table 11.

TABLE 11

| Resin cycle | As (ppm) | Removal (%) |
|---|---|---|
| 1 R | 1.6 | 98.40 |
| 2 R | 1.2 | 98.80 |
| 3 R | 0.6 | 99.40 |
| 4 R | 0.4 | 99.60 |

Example 6

Arsenic Removal in Fluorosilicic Acid by Oxidation with $H_2O_2$ and Ion Exchange 1. 3800 mL of effluent was taken from an HF manufacturing plant that uses high arsenic spar. The sample was analysed and found to contain 25.13% $H_2SiF_6$, 5.48% HF and 70 ppm arsenic
2. The sample was mixed at 350 rpm
3. 3 mL of 30% $H_2O_2$ was added
4. Reaction begins and ends after 18 hours of continuous stirring.
5. The sample was introduced to a packed column of 185 g of anionic resin (Purolite PFA 300)

6. A liquid outlet flow was adjusted to 5 mL/min
7. Samples were obtained every 15 minutes
8. The results are set out in Table 12.

TABLE 12

| Sample | Time (min) | As (ppm) | Removal (%) |
|---|---|---|---|
| 1 | 15 | 1.3 | 98.1% |
| 2 | 30 | 4.6 | 93.4% |
| 3 | 45 | 4.2 | 94.1% |
| 4 | 60 | 12.4 | 82.3% |
| 5 | 75 | 11.8 | 83.2% |

The invention claimed is:

1. A process for reducing the concentration of one or more arsenic-containing compounds in an aqueous solution comprising at least one fluoroacid to form a treated aqueous solution comprising the fluoroacid, which process comprises:
   (i) contacting the aqueous solution with an oxidising agent to produce one or more precipitated $As^V$-containing compounds; and
   (ii) removal of precipitated arsenic-containing compounds; and
   (iii) the addition of an aqueous alkali solution or slurry, which may take place after step (i) and before step (ii) or after step (ii);
   wherein if the step (iii) takes place after step (ii) the process comprises a subsequent step (iv) of the removal of the precipitate resulting from step (iii);
   wherein the fluoroacid is present in an amount of from about 1 to about 50% by weight based on the total weight of the aqueous solution;
   wherein the addition of the oxidising agent is carried out at a temperature of from 0 to 30° C.;
   wherein step (iii) is carried out at a temperature of from about 0° C. to about 30° C.; and
   wherein in step (i) is carried out at an acidic pH and the oxidising agent is used in a stoichiometric excess of 20 or more times the quantity of oxidizable arsenic-containing compounds.

2. The process according to claim 1, wherein the aqueous solution comprises fluorosilicic acid.

3. The process according to claim 1, wherein the one or more arsenic-containing compounds comprise $AsF_3$ or a hydrolysed form of $AsF_3$.

4. A process according to claim 1, wherein the oxidising agent is selected from chlorine ($Cl_2$), hypochlorite salts ($M^+ClO^-$), hypochlorous acid (HClO), hydrogen peroxide ($H_2O_2$) and permanganate salts ($M^+MnO_4^-$) and mixtures thereof.

5. The process according to claim 1, wherein the removal of the precipitated arsenic-containing compounds comprises gravity-settling, filtration, anion-exchange resin or a combination thereof.

6. The process according to claim 1, wherein step (ii) is preceded by the addition of an aqueous alkali solution or slurry.

7. The process according to claim 1, wherein step (ii) is followed by the addition of an aqueous alkali solution or slurry.

8. The process according to claim 1, wherein the alkali is calcium hydroxide ($Ca(OH)_2$) or calcium oxide (CaO).

9. The process according to claim 8, wherein the calcium hydroxide or calcium oxide is present in an amount of from about 15 to about 20% by weight of the aqueous alkali solution or slurry.

10. The process according to claim 1, further comprising dilution of the aqueous solution to less than 10 wt % fluoroacid prior to the addition of the aqueous alkali solution or slurry.

11. The process according to claim 1, wherein step (i) is carried out in a time period of from about 1 to about 30 minutes.

12. The process according to claim 11, wherein step (i) is carried out in a time period of from 2 to 5 minutes.

13. The process according to claim 1, wherein step (iii) is carried out at a temperature of from about 15° C. to about 30° C.

14. The process according to claim 1, comprising subsequently recycling all or part of the treated aqueous solution and repeating the process of claim 1.

15. The process according to claim 1, wherein from about 50 to about 100% by weight of the arsenic-containing compounds is removed from the aqueous solution.

16. A process according to claim 1, wherein the treated aqueous solution contains about 5 ppm or less of arsenic-containing compounds.

17. The process according to claim 1, wherein the treated aqueous solution contains about 1 ppm or less of arsenic-containing compounds.

18. A process for the production of fluorosilicic acid comprising the process as defined in claim 1, wherein the aqueous solution comprises fluorosilicic acid.

19. A process for the purification of fluorosilicic acid comprising the process as defined in claim 1, wherein the aqueous solution comprises fluorosilicic acid.

20. The process according to claim 1, wherein the aqueous solution comprises fluorosilicic acid and hydrofluoric acid.

21. The process according to claim 1, wherein the aqueous solution comprises fluorosilicic acid and hydrofluoric acid in a combined amount of at least 20% by weight.

22. The process according to claim 1, wherein the step (i) is carried out at an acidic pH of less than 3.

23. A process for reducing the concentration of one or more arsenic-containing compounds in an aqueous solution comprising at least one fluoroacid to form a treated aqueous solution comprising the fluoroacid, which process comprises:
   (i) contacting the aqueous solution with an oxidising agent to produce one or more precipitated $As^V$-containing compounds; and
   (ii) removal of precipitated arsenic-containing compounds; and
   (iii) the addition of an aqueous alkali solution or slurry, which may take place after step (i) and before step (ii) or after step (ii);
   wherein if the step (iii) takes place after step (ii) the process comprises a subsequent step (iv) of the removal of the precipitate resulting from step (iii);
   wherein the fluoroacid comprises fluorosilicic acid;
   wherein the addition of the oxidising agent is carried out at a temperature of from 0° C. to 30° C.;
   wherein step (iii) is carried out at a temperature of from about 0° C. to about 30° C.;
   wherein in step (i) the oxidising agent is used in a stoichiometric excess of 20 or more times the quantity of oxidizable arsenic-containing compounds, and the oxidising agent is selected from chlorine ($Cl_2$), hypochlorite salts ($M^+ClO^-$), hypochlorous acid (HClO), hydrogen peroxide ($H_2O_2$) and permanganate salts ($M^+MnO_4^-$) and mixtures thereof; and
   wherein the alkali is calcium hydroxide ($Ca(OH)_2$) or calcium oxide (CaO).

24. The process according to claim 23, wherein the step (i) is carried out at an acidic pH of less than 3.

\* \* \* \* \*